United States Patent [19]

Spicher

[11] Patent Number: 4,787,807
[45] Date of Patent: Nov. 29, 1988

[54] APPARATUS FOR AUTOMATICALLY EXTRACTING OBJECTS FROM CONTAINERS

[76] Inventor: Hermann Spicher, Forststrasse 7, 5060 Bergisch Gladbach 1, Fed. Rep. of Germany

[21] Appl. No.: 4,221

[22] Filed: Dec. 30, 1986

Related U.S. Application Data

[63] Continuation of Ser. No. 644,620, Aug. 27, 1984, abandoned.

[30] Foreign Application Priority Data

Sep. 7, 1983 [DE] Fed. Rep. of Germany ....... 3332196

[51] Int. Cl.$^4$ ............................................. G06F 15/46
[52] U.S. Cl. .................................... 414/416; 414/225; 414/626; 414/730; 414/735; 414/738; 901/3; 901/9; 901/15; 901/23; 901/48
[58] Field of Search ............... 414/403, 404, 406, 416, 414/225, 226, 626, 729, 730, 732, 735, 738, 739, 740, 741, 749, 751, 752, 753, 120, 121, 122, 744 A, 744 B, 744 C; 901/3, 9, 14, 15, 23, 48

[56] References Cited

U.S. PATENT DOCUMENTS

| | | | |
|---|---|---|---|
| 2,344,108 | 3/1944 | Roselund | 901/15 X |
| 2,566,616 | 9/1951 | Larson | 414/735 |
| 2,849,139 | 8/1958 | Drain et al. | 414/426 |
| 3,884,363 | 5/1975 | Ajlouny | 414/626 |
| 4,226,567 | 10/1980 | Van Orsdale, Jr. | 414/735 X |
| 4,262,795 | 4/1981 | Hecker | 414/416 X |
| 4,287,459 | 9/1981 | Dahlström | 414/730 X |
| 4,367,998 | 1/1983 | Causer | 901/15 X |
| 4,407,625 | 10/1983 | Shum | 414/735 X |
| 4,412,293 | 10/1983 | Kelley et al. | 414/730 X |
| 4,435,116 | 3/1984 | Van Deberg | 901/14 X |

Primary Examiner—Frank E. Werner
Attorney, Agent, or Firm—Browdy and Neimark

[57] ABSTRACT

An apparatus for automatically extracting objects individually from containers comprises a stand, beneath which a container having the objects that are to be extracted can be erected; an extractor arm movably disposed on the stand in the area above the container; a device for axially extending and retracting the extractor arm; and a device for guiding the grasping element of the extractor arm to various areas in the container interior. In order to attain reliable emptying of the container, especially in the rim areas and corners, a holding device for the extractor arm is provided, which is connected to the stand via a cardan joint suspension system. A drive mechanism is provided for the longitudinal displacement of the extractor arm relative to the holding device, as are further drive mechanisms for pivoting the holding device in two vertical planes at right angles to one another.

8 Claims, 2 Drawing Sheets

APPARATUS FOR AUTOMATICALLY EXTRACTING OBJECTS FROM CONTAINERS

This application is a continuation of application Ser. No. 644,620, filed Aug. 27, 1984, now abandoned.

FIELD OF THE INVENTION

The present invention relates to an apparatus for automatically extracting objects, either individually or in groups, from containers. The apparatus includes a stand, beneath which or in the vicinity thereof at least one container having the objects to be extracted can be positioned; an extractor arm disposed movably on the stand in the area above the container; a device for axially extending and retracting the extractor arm; and a device for guiding the extractor arm grasping element toward various areas inside the container.

BACKGROUND OF THE INVENTION

Known automatically operating extractor apparatus of this general type have a vertically disposed extractor arm which can be driven in a coordinate system in a horizontal plane and is extendable and retractable in the direction of its longitudinal axis.

Modern receptacle containers, especially those which must be very sturdily built so as to transport heavy objects, have an upper rim, drawn partway inward at least in some areas, consequently making it difficult to remove objects from the lower side areas and the corners using the known extractor apparatus. It may therefore happen with the known apparatus that individual objects cannot be extracted from the container.

SUMMARY OF THE INVENTION

Accordingly, it is an object of the present invention to improve an extractor apparatus of the type discussed above such that satisfactory emptying of the containers is assured.

In accordance with the present invention, this object is attained by the provision of an apparatus which includes a holding device for the extractor arm which is connected to the frame via a cardan joint suspension system, by a drive mechanism for the longitudinal displacement of the extractor arm relative to the holding device, and further drive mechanisms for pivoting the holding device in various planes which are at angles to one another.

In the present apparatus according to the invention it is possible to guide the extractor arm obliquely into the corners or underneath the upper edge of the container, so that all areas of the container interior are readily accessible to the extractor arm. Furthermore, the cost of construction is less due to the use of the cardan suspension system of the extractor arm.

Moving the holding device of the present invention in the area of the cardan joint suspension system, is accomplished by two drive mechanisms for pivoting the holding device in two vertical planes at right angles to one another.

The cardan joint suspension system of the present invention of the holding device may have a horizontal, pivotable supporting beam supported in the stand as well as a cross beam supported on the supporting beam, the holding device being suspended on the cross beam. On the supporting beam, rigid supporting arms may be provided on both sides of the holding device of the extractor arm, the supporting arms being located in the pivoting plane of the holding device, which is defined by the cross beam. A drive mechanism for pivoting the holding device about the cross beam is disposed between the two supporting arms. Due to the type of suspension used, movement of the extractor arm into all the areas of the container is made possible by relatively simple means.

A drive mechanism of the present invention for pivoting the holding device about the cross beam is accomplished by a threaded spindle which is rotatable with the aid of a motor and a nut supported on a spindle, such that the nut is not rotatable relative to the holding device; the nut being connected to the holding device via a carrier rod, and both connecting points being articulated joints.

Pivoting the holding device about the supporting beam is achieved by providing a drive mechanism which at one end engages the stand and at the other end engages at least one of the supporting arms. The drive mechanism for pivoting the holding device about the supporting beam also includes a threaded spindle which is axially stationary relative to the stand and drivable by means of a motor, and a nut seated on a spindle, which is joined via a toggle link to a respective supporting arm.

The extractor arm of the present invention is expediently guided longitudinally displaceably on the holding device. A carrier is movable via a threaded spindle with the aid of a motor acting as the drive mechanism for the extractor arm. The extractor arm is preferably supported by its own weight at the top on the carrier, so that when the extractor arm meets any resistance, a free-wheeling effect results; in other words, the extractor arm is not driven any longer.

Trip cams for actuating counting switches may be provided on the threaded spindles, so that the extractor arm can be moved into a precisely prespecified position by various specified numbers of rotations of the threaded spindles. The extractor arm is preferably controllable in accordance with prespecified programs, and the drive motors are switched on and off via the counting switches.

The particular program, according to which the holding device supporting the extractor arm is moved, may be adjusted to various container sizes and shapes and also to various types and shapes of objects to be extracted.

If the apparatus is provided for extracting magnetizable objects, an electromagnet may be provided as the grasping element of the extractor arm. This electromagnet is preferably suspended by a cardan joint.

BRIEF DESCRIPTION OF THE DRAWINGS

The present invention is illustrated in the drawings by way of example and described in detail below.

DESCRIPTION OF PREFERRED EMBODIMENT

Figure 1:
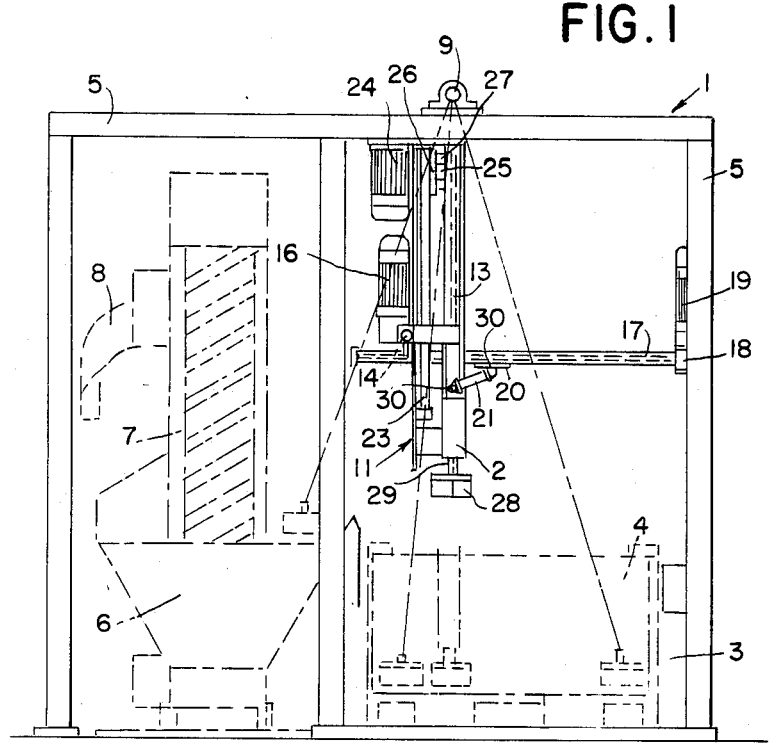
FIG. 1 is a front elevational view of an apparatus of the present invention for the automatic extraction of individual objects from containers.
Figure 2:
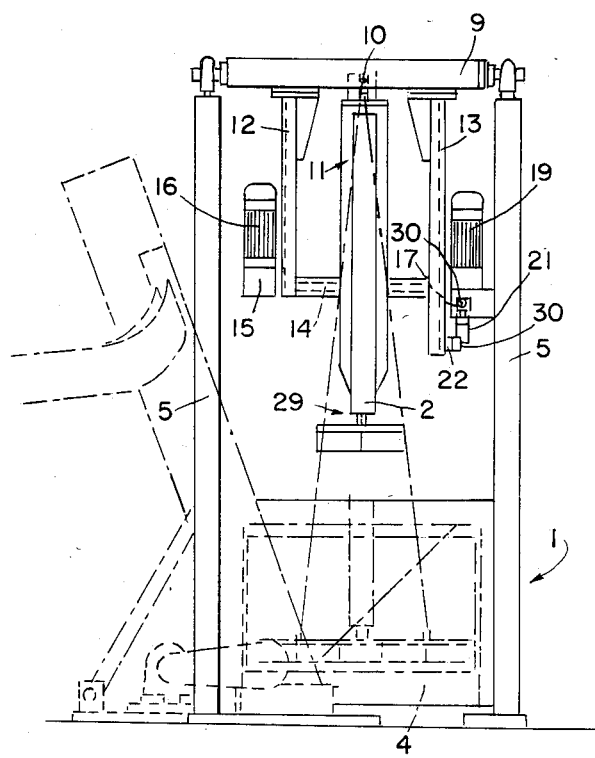
FIG. 2 is a side elevational view of the apparatus of the present invention.
Figure 3:
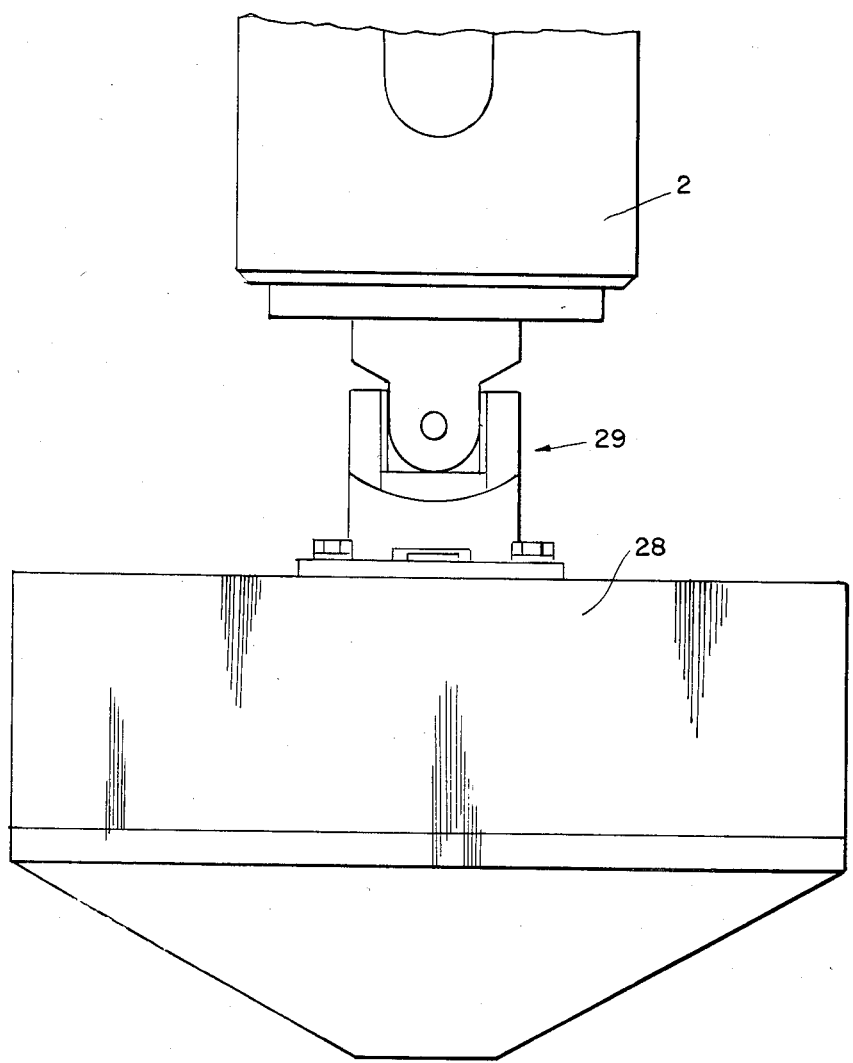
FIG. 3 shows a cardan joint supporting an electromagnet as a grasping element from the extractor arm.

Referring to FIG. 1 of the drawings, the automatic extractor apparatus substantially includes a stand 1, an extractor arm 2 suspended on the stand by a cardan joint 29 and a receiving area 3 in the lower portion of the stand 1 below the extractor arm 2, for a container 4 that is to be emptied.

The stand 1 is incorporated with sturdy steel beams 5 and is provided with a protecting sheathing on its outside, not shown in detail in the drawing, which can be opened at the side or top for the insertion of a container 4.

Inside the stand 1, or laterally beside it, a collecting container 6 is provided for the objects individually extracted from the container 4. With the aid of an inclined hoist 7, the objects are delivered to an outlet chute 8. Alternatively, other conveying and sorting devices are also conceivable.

An upper supporting beam 9, which is supported at the top on the stand 1, serves to effect the cardan suspension of the extractor arm 2. Approximately in the center of the supporting beam 9, a short cross beam 10 is supported, and a holding device 11 for the extractor arm 2 is suspended on the cross beam 10. The center line of the cross beam 10 extends precisely at right angles to the center line of the supporting beam 9.

On the opposite sides of the center line of the cross beam 10, spaced apart from the cross beam, respective supporting arms 12 and 13 are secured to the supporting beam 9. In the outset position, the supporting arms 12 and 13 hang vertically downward, similar to the extractor arm 2.

Between the two supporting arms 12 and 13 is disposed a threaded spindle 14, which is drivable via a step-down gear 15 with the aid of an electric motor 16. The gear and the motor are secured on the supporting arm 12. A nut, not shown in detail in the drawing, is seated on the threaded spindle 14; the nut is not able to rotate relative to the holding device 11 and is connected to the holding device via a carrier rod; both connecting points are embodied as articulated joints, so that when the holding device 11 pivots, the differences in level between the articulation points on the holding device 11, and the nut can be compensated for.

A threaded spindle 17, which is stationary relative to the stand 1 and is drivable via a step-down gear 18 by means of an electric motor 19, serves to pivot the holding device 11 about the supporting beam 9. All that is visible in the drawing of the threaded spindle 17, as in the case of the threaded spindle 14 extending crosswise to it, is an outer sheathing surrounding each spindle. A nut 20 is seated on the threaded spindle 17 protruding out of the sheathing at the bottom. Accordingly, only the lower portion of the nut 20 is visible. The nut 20 is joined via an articulated joint 30 to one end of a toggle link 21. The other end of toggle link 21 is joined via a like articulated joint 30 to a bearing tang 22, which is provided on the side of the supporting arm 13 oriented toward the threaded spindle 17.

Also provided on the holding device 11 is a threaded spindle 23, which is drivable with the aid of an electric motor 24. A nut 25 is seated on the threaded spindle 23 and a carrier 26 cooperating with the extractor arm 2 is disposed on the nut 25. The extractor arm 2 rests with a support plate 27 on the carrier 26, so that what rests on the support plate 27 is the weight of the extractor arm 2, perhaps reduced by a dead weight, not shown. When the carrier 26 is lowered, it carries the extractor arm 2 along with it due to its own weight. When the grasping element 28 at the bottom of the extractor arm 2 meets an object that is to be extracted, the extractor arm 2 comes to a stop, while the carrier 26 can still move some distance beyond. This free-wheeling effect has the result that the extractor arm 2 can be placed upon some object to be extracted while exerting no more than its own weight, optionally reduced by the counterweight provided. As a result, extremely gentle handling of the objects that are to be extracted is assured.

If magnetizable objects are to be removed from the container 4, the grasping element 28, which is disposed such that it can be removed and replaced, can be an electromagnet. This magnet is likewise suspended by a cardan joint 29 at the lower end of the extractor arm 2, so that no matter what the position of the extractor arm 2, the magnet can always be placed precisely vertically upon an object that is to be extracted.

The operation of the apparatus of the present invention may be effected via a programmable control unit (not shown in the drawing) of a type which is long and well-known in the relevant art, as for example that taught by U.S. Pat. No. 3,884,363 to Ajlouny.

By using such a control unit, the extractor arm of the present invention may be moved such that it scans the cross-section of the container in a grid pattern, line by line, and at a specified number of positions in each line. The grid pattern can be adjusted to correspond with the size of the container being used and the objects that are to be extracted.

The downward movement of the extractor arm 2 may be terminated immediately after the grasping element 28 is in place of an object. The lowermost position, prior to touching the bottom, may be terminated immediately after the grasping element is in place of an object. The lowermost position prior to touching the bottom, as the container becomes empty, may also be programmed for all possible depths to which the arm may plunge.

Upon each lifting movement, it is possible to monitor whether objects have been taken up with the arm. If there is a nil indication, the extractor arm 2 can be moved into the next programmed grid position. Positions which are recognized, at the maximum plunging depth, as being empty are not approached again.

Control of the apparatus of the present invention may be effected via actuation of the three electric motors 16, 19 and 24. Each threaded spindle associated with a respective one of the electric motors is provided with a counting switch for determining the times at which the motors are to be switched on and off. In addition, each of the threaded spindles is provided with a trip cam which actuates, as the spindles rotate, a respective one of the counting switches. Alternating-current braking motors are preferably used as the electric motors.

Due to the use of the cardan joint suspension of the extractor arm 2, it can be pivoted in any arbitrary position. Since the extractor arm is suspended over the container opening, it can be driven steadily obliquely as it approaches the inner rim areas and corners of the container, so that it can readily reach into all areas, moving past the upper, inwardly drawn container rim. Once the extractor arm 2 has grasped an object, it can pivot laterally toward the left, as shown in FIG. 1, and deposit the object in the collecting container 6.

In the exemplary embodiment shown in the drawing, the cardan joint suspension of the extractor arm 2 is not directly above the center of the container 4 but is instead shifted somewhat toward the side of the collecting container 6, so that the lateral pivoting angle in both directions can be exploited to the fullest and the maximum pivoting angle can be kept small. The pivoting angle for reaching the collecting container is exactly the same size as the pivoting angle for approaching the opposite rim of the container 4.

It will be obvious to those skilled in the art that various other changes and modifications may be made without departing from the scope of the invention and the invention is not to be considered limited to what is shown in the drawings and described in the specifications.

We claim:

1. An apparatus for the automatic extraction of objects, individually or in groups, from containers, including a stand beneath which at least one container in which the objects to be extracted is positioned, an extractor arm disposed in a movable manner on the stand in the area above the container, a device for the axial extension and retraction of the extractor arm, and a device for guiding a grasping element of the extractor arm toward various interior areas in each said container, comprising:

a holding means for the extractor arm and a cardan join suspension connecting said holding means to said stand, first drive means for displacing the extractor arm longitudinally relative to said holding means, and second drive means for pivoting said holding means in various planes located at angles from one another, wherein said supporting beam has first and second supporting arms rigidly connected therewith, each said arm being located in a pivoting plane in which said holding means with said extractor arm is effectively limited to pivot, said pivoting plane containing said support beam and being perpendicular to said cross beam, and said second drive means includes a first drive mechanism for pivoting the holding means about the cross beam, said first drive mechanism being disposed between said first and second supporting arms.

2. An apparatus as defined by claim 1, wherein said second drive means include two drive mechanisms for pivoting the holding means in two respective pluralities of vertical planes located at right angles to one another.

3. An apparatus as defined by claim 1, wherein said cardan joint suspension of said holding means includes a horizontal supporting beam pivotably supported on the stand and a cross beam supported on the supporting beam for suspending therefrom said holding means.

4. An apparatus as defined by claim 1, and further including for the automatic extraction of objects, individually or in groups, from containers, including a stand beneath which at least one container in which the objects to be extracted are positioned, an extractor arm disposed in a movable manner on the stand in the area above the container, a device for the axial extension and retraction of the extractor arm, and a device for guiding a grasping element of the extractor arm toward various interior areas in each said container, comprising:

a holding means for the extractor arm and a cardan joint suspension connecting said holding means to said stand, said cardan joint suspension of said holding means including a horizontal supporting beam pivotably supported on the stand and a cross beam supported on the supporting beam for suspending therefrom said holding means, first drive means for displacing the extractor arm longitudinally relative to said holding means, said supporting beam having first and second supporting arms rigidly connected therewith, said supporting arms and said supporting beam defining a pivoting plane in which said holding means with said extractor arm is effectively limited to pivot, said pivoting plane being perpendicular to said cross beam, and second drive means for pivoting said holding means in two pluralities of planes located at angles from one another, including a first device mechanism for pivoting the holding means about the cross beam being disposed between said first and second supporting arms, said first drive mechanism including:

first rotatable threaded spindle means;

a first motor for rotating said first rotatable threaded spindle means to pivot said holding means about an axis of the pivoting of said cross beam on said supporting beam;

a first nut, non-rotatably supported relative to the holding means, and disposed on said first rotatable threaded spindle means; and a carrier rod rotatably connected at a first connection point to said first nut, and rotatably connected at a second connection point to said holding means.

5. An apparatus as defined by claim 1, wherein said second drive means includes a second drive mechanism for pivoting the holding means about an axis of the pivoting of said supporting beam on said stand, said second drive mechanism engaging, at one end, the stand and engaging, at the other end, at least one of the supporting arms.

6. An apparatus as defined by claim 4, said second drive means further including a second drive mechanism comprising:

second threaded spindle means supported on, and axially stationary relative to, the stand, said second spindle means being drivable by a second motor for rotating said second spindle means so that said cross beam with said holding means is pivoted about an axis of the pivoting of said supporting beam on said stand, a nut coupled to said second spindle means, and a toggle link connecting said nut with a first of said supporting arms.

7. An apparatus as defined by claim 1, wherein said extractor arm is guided for longitudinally displaceable movement on the holding means, said apparatus further including a carrier mounted on said holding means, said first drive means comprising a motor and a threaded spindle, said motor being coupled with said carrier and said spindle for moving said extractor arm longitudinally on said holding means.

8. An apparatus as defined by claim 7, wherein said extractor arm is supported on said carrier by its own weight.

* * * * *